(12) United States Patent
Athsani et al.

(10) Patent No.: US 7,865,308 B2
(45) Date of Patent: Jan. 4, 2011

(54) USER-GENERATED ACTIVITY MAPS

(75) Inventors: Athellina R. A. Athsani, San Jose, CA (US); Ron Martinez, San Francisco, CA (US); Chris T. Kalaboukis, Los Gatos, CA (US); Marc Davis, San Francisco, CA (US); Joseph O'Sullivan, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 356 days.

(21) Appl. No.: 11/966,972

(22) Filed: Dec. 28, 2007

(65) Prior Publication Data

US 2009/0171939 A1   Jul. 2, 2009

(51) Int. Cl.
G06F 17/30 (2006.01)
(52) U.S. Cl. ................................ 701/214; 707/706
(58) Field of Classification Search .......... 701/214; 707/706
See application file for complete search history.

(56) References Cited

U.S. PATENT DOCUMENTS

| | | | | |
|---|---|---|---|---|
| 6,047,234 A * | 4/2000 | Cherveny et al. | ............ | 701/200 |
| 6,314,365 B1 * | 11/2001 | Smith | ............ | 701/200 |
| 6,502,033 B1 * | 12/2002 | Phuyal | ............ | 701/214 |
| 6,526,339 B1 * | 2/2003 | Laughlin et al. | ............ | 701/19 |
| 6,853,913 B2 * | 2/2005 | Cherveny et al. | ............ | 701/208 |
| 6,961,660 B2 * | 11/2005 | Underbrink et al. | ............ | 701/213 |
| 6,985,839 B1 * | 1/2006 | Motamedi et al. | ............ | 703/6 |
| 7,058,508 B2 * | 6/2006 | Combs et al. | ............ | 701/213 |
| 7,110,776 B2 * | 9/2006 | Sambin | ............ | 455/456.1 |
| 7,219,013 B1 * | 5/2007 | Young et al. | ............ | 701/214 |
| 7,254,581 B2 * | 8/2007 | Johnson et al. | ............ | 707/627 |
| 7,257,570 B2 * | 8/2007 | Riise et al. | ............ | 707/706 |
| 2007/0282621 A1 * | 12/2007 | Altman et al. | ............ | 705/1 |
| 2009/0073191 A1 * | 3/2009 | Smith et al. | ............ | 345/629 |

OTHER PUBLICATIONS

Anonymous. (Date Unknown). "CommunityWalk—About," located at <http://www.communitywalk.com/about>, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

(Continued)

*Primary Examiner*—Don Wong
*Assistant Examiner*—Kim T Nguyen

(57) ABSTRACT

Apparatus and computer-readable media for associating metadata with a geographic location are provided. The apparatus includes logic for detecting that a mobile device is present at a geographic location relevant to a user of the mobile device, logic for retrieving context information associated with the location, logic for selecting a program code module based upon a contextual relevancy of the location, logic for providing the program code module for execution, where the program code module is capable of performing processing specific to at least one aspect of the location, the processing is based upon the context information, and the program code module is further capable of receiving at least one input data item from the mobile device, where the at least one input data item describes an activity of the user at the location, and logic for associating the at least one input data item with the location.

33 Claims, 9 Drawing Sheets

OTHER PUBLICATIONS

Anonymous. (Date Unknown). "Google Earth—Wikipedia, the Free Encyclopedia," located at <htp://en.wikipedia.org/wiki/Google_earth>, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html>, nine pages.

Anonymous. (Date Unknown). "Google Maps," located at <http://en.wikipedia.org/wiki/Google_maps>, last visited on Feb. 27, 2008, eleven pages.

Anonymous. (Date Unknown). "Live Search Maps," located at <http://en.wikipedia.org/wiki/Windows_live_; maps>, last visited on Mar. 3, 2008, six pages.

Anonymous. (Date Unknown). "WikiMapia," located at <http://en.wikipedia.org/wiki/WikiMapia>, last visited on Mar. 3, 2008, three pages.

Anonymous. (2007). "Ask.com Maps & Directions," located at <http://maps.ask.com/maps>, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com>, last visited on Mar. 3, 2008, one page.

Anonymous. (2008). "Wikimpaia.org," located at <http://wikimpaia.org/>, last visited on Mar. 3, 2008, one page.

\* cited by examiner

USER-GENERATED ACTIVITY MAPS

BACKGROUND

1. Field

The present application relates generally to collection of information related to locations, and more particularly to distribution and collection of information via a mobile device based on the location of the device and on contextual information, such as information related to the location and information related to the user of the device.

2. Related Art

Computer-based mapping systems that display maps annotated with locations of interest are known in the art. These systems may use a Global Positioning System (GPS) receiver to ascertain a device's position, and display a geographical map of the area around the device. The map may show streets, landmarks, and other points of interest, such as restaurants, stores, museums, banks, transportation links, and the like. Information about the points of interest may also be displayed, such as the name of each point of interest. The displayed map may scroll to display the geographical area surrounding the device's position as the device moves.

Methods for annotating maps are also known in the art. A user may attach a textual note to a location on a map displayed on a computer. Reviews and ratings of points of interest may also be displayed on the map. For example, the name of a restaurant or other place of business may be displayed on the map in association with the restaurant's location, along with a user-generated rating. Users may enter ratings or reviews by clicking on or selecting the restaurant. A dialog box may then be displayed prompting the user for a review. The user-provided review and/or rating may be stored in a database, and when the map is subsequently viewed, the restaurant's rating and/or review will reflect the user-provided information.

These existing methods, however, are limited to certain specific uses, e.g., finding driving directions or reviews and ratings of points of interest. It would be beneficial, therefore, to provide a more general method for storing and retrieving information related to points of interest.

SUMMARY

In general, in a first aspect, the invention features an apparatus for receiving metadata to be associated with a geographic location. The apparatus includes logic for detecting that a mobile device is present at a geographic location, wherein the location is relevant to a user of the mobile device, logic for retrieving context information associated with the location, logic for selecting a program code module based upon a contextual relevancy of the location, logic for providing the program code module for execution, wherein the program code module is operable to perform processing specific to at least one aspect of the location, the processing is based upon the context information, and the program code module is further operable to receive at least one input data item from the mobile device, wherein the at least one input data item describes an activity of the user at the location, and logic for associating the at least one input data item with the location.

Embodiments of the invention may include one or more of the following features. The context information may include user-independent information, user-specific information associated with the user, or a combination thereof. Detecting that a mobile device is present at a geographic location may include receiving coordinates of the mobile device and waiting until the mobile device has been present at the location for more than a threshold period of time. The program code module may include a widget. Providing may include providing the program code module to a client device. Providing may include causing execution of the program code module. Processing may include displaying the context information, querying a computer system for the at least one input data item, receiving the at least one input data item from the computer system, querying a user for the at least one input data item, receiving the at least one input data item from the user via an input device of the mobile device, or a combination thereof. Associating the at least one input data item with the location may include storing the at least one input data item in a database in association with the location.

In general, in a second aspect, the invention features an apparatus for providing metadata for use at a geographic location. The apparatus includes logic for detecting that a mobile device is present at a geographic location, wherein the location is relevant to a user of the mobile device, logic for retrieving context information associated with the location, logic for selecting a program code module based upon a contextual relevancy of the location, and logic for providing the program code module for execution, wherein the program code module is operable to perform processing specific to at least one aspect of the location, wherein the processing is based upon the context information, and the program code module is further operable to select at least one output data item from the context information and to provide the at least one output data item to the mobile device.

Embodiments of the invention may include one or more of the following features. The context information may include user-independent information, user-specific information associated with the user, or a combination thereof. Detecting that a mobile device is present at a geographic location may include receiving coordinates of the mobile device and waiting until the mobile device has been present at the location for more than a threshold period of time. The program code module may include a widget. Providing may include providing the program code module to a client or causing execution of the program code module.

In general, in a third aspect, the invention features an apparatus for gathering and presenting data related to location-based activities. The apparatus includes logic for receiving a location of a user, wherein the location corresponds to geographical coordinates of the user, logic for retrieving context information that corresponds to the location, logic for determining if the location is relevant to the user, based upon the context information, logic for selecting a program code module if the location is relevant to the user, wherein the program code module is selected based upon the contextual relevancy of the location to the user, and the contextual relevancy is based upon the location and the context information, and logic for providing the program code module for execution, wherein the program code module is operable to provide at least one output data item, receive at least one input data item, or a combination thereof.

Embodiments of the invention may include one or more of the following features. The program code module may generate the at least one output data item based upon the context information. The apparatus may further include logic for retrieving user context information that corresponds to the location. The location may be within a predetermined distance of the geographical coordinates of the user. The program code module may include a widget. Providing may include providing the program code module to a client device or causing execution of the program code module.

In general, in a fourth aspect, the invention features a computer-readable medium comprising instructions for receiving metadata to be associated with a geographic location. The instructions are for detecting that a mobile device is present at a geographic location, wherein the location is relevant to a user of the mobile device, retrieving context information associated with the location, selecting a program code module based upon a contextual relevancy of the location, causing execution of the program code module, wherein the program code module is operable to perform processing specific to at least one aspect of the location, wherein the processing is based upon the context information, and the program code module is further operable to receive at least one input data item from the mobile device, wherein the at least one input data item describes an activity of the user at the location, and associating the at least one input data item with the location.

Embodiments of the invention may include one or more of the following features. The context information may include user-independent information, user-specific information associated with the user, or a combination thereof. Detecting that a mobile device is present at a geographic location may include receiving coordinates of the mobile device and waiting until the mobile device has been present at the location for more than a threshold period of time. The program code module may include a widget.

In general, in a fifth aspect, the invention features a computer-readable medium comprising instructions for providing metadata for use at a geographic location. The instructions are for detecting that a mobile device is present at a geographic location, wherein the location is relevant to a user of the mobile device, retrieving context information associated with the location, selecting a program code module based upon a contextual relevancy of the location, and causing execution of the program code module, wherein the program code module is operable to perform processing specific to at least one aspect of the location, wherein the processing is based upon the context information, and the program code module is further operable to select at least one output data item from the context information and to provide the at least one output data item to the mobile device.

Embodiments of the invention may include one or more of the following features. Providing the at least one output data item may include causing display of the at least one output data item on a mobile device. Providing the at least output data item may include transmitting the at least one output data item to the computer via a network.

In general, in a sixth aspect, the invention features a computer-readable medium comprising instructions for gathering and presenting data related to location-based activities. The instructions are for receiving a location of a user, wherein the location corresponds to geographical coordinates of the user, retrieving context information that corresponds to the location, determining if the location is relevant to the user, based upon the context information, selecting a program code module in response to the location being relevant to the user, wherein the program code module is selected based upon the contextual relevancy of the location to the user, and the contextual relevancy is based upon the location and the context information, and providing the program code module for execution, wherein the program code module is operable to provide at least one output data item, receive at least one input data item, or a combination thereof.

Embodiments of the invention may include one or more of the following features. The program code module may generate the at least one output data item based upon the context information. The instructions may further include retrieving user context information that corresponds to the location. The location may be within a predetermined distance of the geographical coordinates of the user. The program code module may include a widget.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
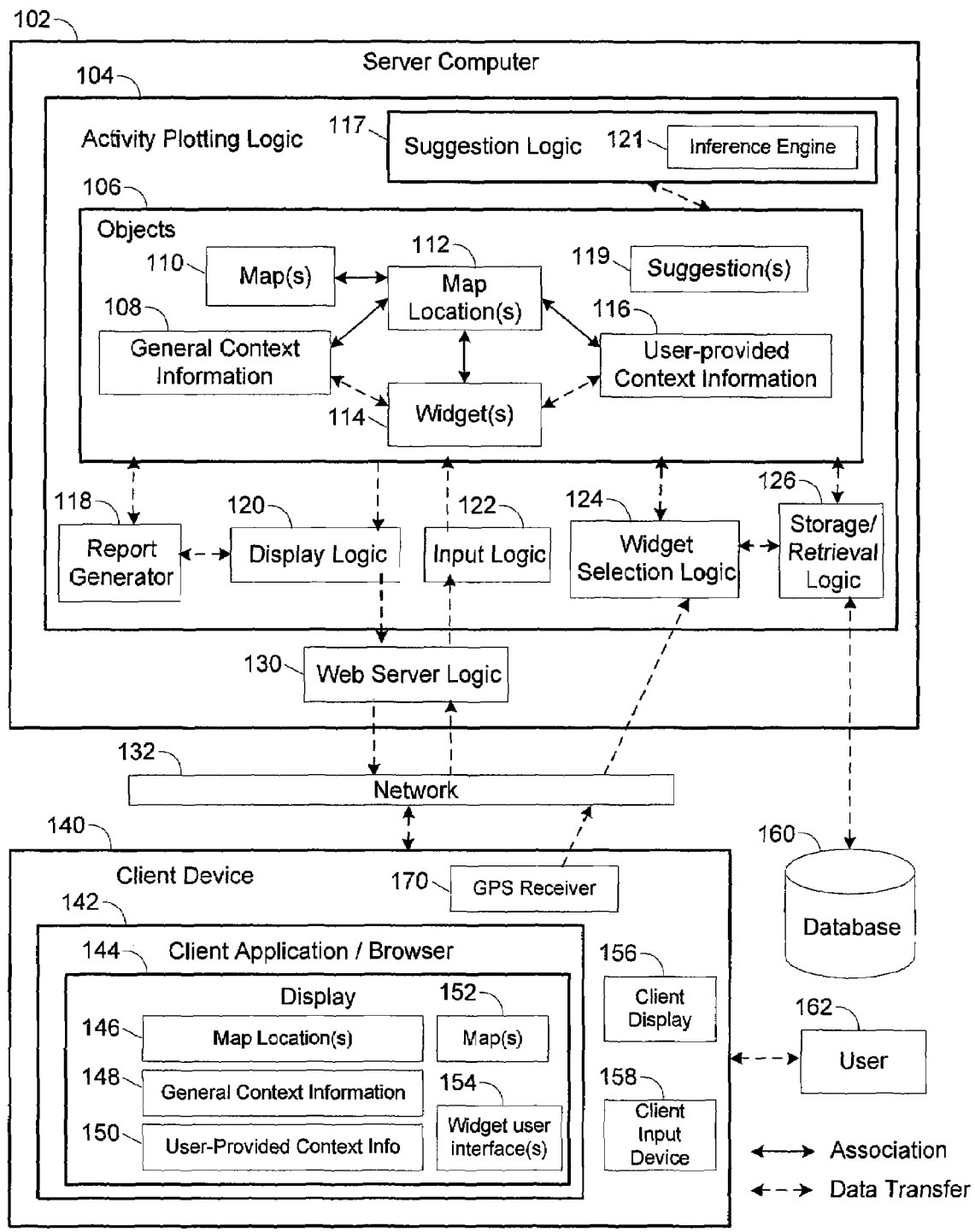
FIG. 1 illustrates a server-based activity plotting system in accordance with embodiments of the invention.

FIG. 1 illustrates a server-based activity plotting system in accordance with embodiments of the invention. In one example, one or more users 162 may use a map 152 displayed on, for example, a personal computer or on a mobile device 140, to track daily activities. The mobile device 140 may communicate with a server computer 102 which provides activity plotting logic 104 that assists a user 162 in tracking daily activities by collecting information about user activities, either as the activities occur or subsequently. The activity plotting logic 104 may present the information to the user and present suggestions as the user visits geographic locations that are relevant to particular pieces of information or to the user's interests. The activity plotting logic 104 is located on the server 102 in FIG. 1 as one possible example. In other examples, the activity plotting logic 104 may be located on the client device 140, and may communicate with the database 160 via the network 132.

In one example, map locations 112 are particular positions on the map 110, such as latitude/longitude coordinates. The map locations 112 may be associated with widgets 114, which gather information related to the map locations 112 and generate information related to the map locations 112 based on contextual information such as general context information 108 and user-provided context information 116. The particular widgets 114 that are activated when a user visits a location 112 may, for example, be selected based on contextual information about the user's preferences or about the location 112, and/or based on the amount of time the user has been present continuously or nearly-continuously at the location 112. A widget 114 may receive information about a map location 112, e.g., a list of items purchased at a store, as input that the user enters into the mobile device itself. In another example, a widget 114 may receive information from a computer-based system located at or near the map location, e.g., a wireless communication system associated with a Point of Sale (POS) terminal in a store, where the wireless system transmits the list of purchased items to the mobile device while the user is in the store. In another example, the widget 114 may receive the information at a later time via a computer, e.g., when a user returns home and visits a web page that displays the widget and allows the user to provide the information requested by the widget 114.

In one example, a user's mobile device, such as the client device 140, may be enabled to perform activity tracking by establishing a network link to activity plotting logic 104 located on a server computer 132, or by loading activity plotting logic onto the mobile device, e.g., in the form of computer program code. The activity plotting logic 104 monitors the location of the mobile device, e.g., by receiving GPS coordinates from the mobile device 140. The GPS coordinates may be provided by a GPS receiver 170 located in or associated with the device 140. When the mobile device 140 is in a location of interest, e.g., a store, restaurant, movie theater, or other location listed in a database of known locations, the activity plotting logic 104 selects one or more widgets 114 that are appropriate for that location. The decision of whether a location is a location of interest is made by widget selection logic 124, which may evaluate the importance of the location to the user using general context information 108 and user-provided context information 116, which may include the types of locations that the user frequently visits, the user's schedule, and other user-specific information. The importance of the location to the user is also referred to herein as the "contextual relevancy" of the location. In one example, location contextual relevancy is determined based upon the user's historical information pertaining to the location (e.g. past visits), visits to similar locations with high relevancy (such as similar stores or store chains, or relevancy set by other users for such locations), and/or the user's frequent activities that are relevant to the location. For example, if a user is traveling out of their home state and is looking for a hotel room, when the user approaches a hotel that is within the user's preferred mileage hotels, the system may alert the user of the hotel's location, room availability, and rating.

The widget selection logic 124 may base its determination of whether a location is relevant upon the amount of time the user has been present at the location. In one aspect, if a user is within a threshold distance (e.g., 1 meter, 3 meters, or 10 meters) of a location for less than a threshold time (e.g., 15 seconds, 30 seconds or 1 minute), the location is not relevant, but if the user is within the threshold distance for more than the threshold time, the location may be relevant, depending on whether the contextual information associated with the location matches a portion of the user's preference information or historical information. For example, the widget selection logic 124 may determine that a store is not relevant to a user if the user spends less than one minute in the store. As another example, the widget selection logic 124 may determine that a traffic light is not relevant to the user even if the user spends 20 minutes at the traffic light, because contextual information, determined based upon the GPS coordinates of the traffic light, does not match any of the user's preferences or interests. In one example, a user's preferences or interests may be explicitly stored in a database or inferred from the user's explicit preferences or past activities. Inferred preferences may be generated by an inference engine 121 associated with suggestion logic 117 using rule-based techniques, as described below with respect to the inference engine 121.

In another example, widgets may be associated with locations by users. For example, a user interface may allow a user-specified widget 114 to be associated with a location 112 in response to a user request. The widgets 114 include processing code for specialized tasks associated with particular types of locations. In a store, a shopping list widget may be appropriate, and in a restaurant, a meal tracking widget may be appropriate. A widget 114 may be associated with a single location, e.g., a Statue of Liberty widget that is activated when the user is near the Statue of Liberty, or with multiple locations, e.g., a restaurant widget that is activated when the user enters a restaurant.

A widget 114 may perform computations using information about a particular map location 112, e.g., the type of establishment that exists at a location 112, reviews and ratings of the establishment, and/or information received from a computer system at the establishment, such as a restaurant menu or bill received via a wireless network while the user is in the restaurant. A widget may also use user-specific information to generate notices, reminders, and prompts for user input. Such user-specific information may include the user's health conditions, dietary requirements, favorite foods, foods previously enjoyed at the location, spending limits, and daily schedule. A widget may also use information provided by other users, such as reviews and ratings, to generate information to present to the user. In one example, a widget 114 may perform essentially any computation, and the computation may be, for example, in the form of prompting the user 162 for input, storing the input, computing output based on context information that may be independent of the user or associated with the user, and presenting the output to the user.

In one example, a report may be generated based upon the information gathered by the widget(s) 114. For example, a weekly or monthly report of calories consumed may be generated based on the amount of calories that the user 162 has consumed at each meal during that time. The amount of calories consumed at each meal may be determined in this example from the lists of foods consumed that the user entered at each meal.

In one example, a user 162 may provide user-provided context information 116 about locations on a displayed map 152. For example, the user 162 may identify a favorite restaurant or favorite golf courses. The user may track expenses, e.g., money spent at the golf course and on food eaten at the restaurant. The user may also track the particular type or kind of food eaten at the restaurant by providing that information as user-provided context information 116. The context information 116 is associated with the map locations, so that when the user views the map 152, information about the user's favorite places is displayed on or with the map. Furthermore, as the user moves around in the real world, the user's location may be monitored, e.g., by receiving the user's location from the GPS receiver 170 in the device 140 carried by the user. As an alternative to the GPS location tracking, users may provide their locations as they move around in the real world, e.g., by entering the names of locations they visit into a mobile device 140 as they visit the locations. Information previously associated with the map location 112 may be displayed to the user on the mobile device 140. The displayed information may include general context information 108, such as restaurant information and reviews from a database of local information. The displayed information may also include user-provided context information 116 previously provided by the user, such as notes or ratings for the location 112. In one aspect, interactive widgets 114 are linked to the map locations 112, so that when the user visits a particular (real) location, widgets 114 associated with that location provide information to the user and query the user for information. The widgets 114 may be customized for the particular type of location, so that, for example, a widget associated with a restaurant may prompt a user for a list of food consumed at the restaurant and generate a calorie count based on the list, to be used for tracking the user's calorie intake. In one example, the restaurant widget may receive the user's coordinates from a GPS-enabled mobile device carried by (i.e., associated with) the user (e.g., the user's cell phone) in near-real-time, and when the coordinates indicate that the user has entered a restaurant, the restaurant widget executing on the user's mobile device may prompt the user for the list of food items eaten. The restaurant widget may also prompt the user for the price paid for the meal when the user leaves the restaurant according to the user's coordinates, and may add the price to a list of the user's expenditures.

In another example, the widget 114 may receive information from a wireless computer-based system provided by the restaurant instead of prompting the user for the information. For example, the restaurant's wireless system may transmit the user's order to the user's mobile device, and the widget 114 may then generate the calorie count automatically. Furthermore, when the user pays the restaurant bill, the restaurant's wireless system may transmit the payment information, including amount paid and/or credit card number, to the user's mobile device, and the widget may then add the price to the user's list of expenditures. In another example, the restaurant widget may transmit the user's credit card or other payment information to the restaurant's wireless system to automatically pay the bill, and then update the user's list of expenditures.

As another example, a widget 114 associated with a grocery store may provide a shopping list feature. When a user enters a grocery store, the grocery store widget displays the user's shopping list on the user's mobile device. The user may enter information about purchases into the widget's user interface 154, e.g., by checking off items on the shopping list. When the user leaves the store, the widget may update a representation of the user's shopping list in a database of the user's contextual information to reflect the items the user has purchased. The widget 114 may also prompt the user to enter the price(s) paid for the purchase, and the widget 114 may use the payment information to update a representation of the user's budget, e.g., to balance the user's bank account. In another example, the grocery store may provide a wireless system that transmits information such as a list of the user's purchases to the user's mobile device, so that the user need not enter the list of purchases. The grocery store's wireless system may also transmit the price(s) paid by the user for the items, so that the grocery store widget may update the user's budget information.

As another example, when a user 162 enters a favorite bookstore, the suggestion logic 119 may generate a list of books the user has purchased in the past at that store. If the user spends 30 minutes (or more than a threshold amount of time) in the store, then the suggestion logic 110 (or a store widget) may prompt the user to enter information about new purchases. In another example, the prompt for new purchases may be made if the user has spent a threshold amount of time, e.g., 5 or 10 minutes, near the cash register in the store. In another example, when a user enters a new, i.e., not previously visited, restaurant, a restaurant widget may cause contextual information to be displayed on the client device 140, e.g., reviews of the restaurant. When the user leaves the restaurant, the widget may prompt the user to enter a list of menu items eaten. In one example, the restaurant's menu may be presented to the user, so that the user may select items from the menu instead of entering the item names. The widget may receive the menu as general context information 108 or user-provided context information 116, or via a network from a computer in the restaurant or operated by the restaurant. The menu information may be used to track the user's calorie consumption. The widget may also prompt the user to enter the amount of money spent at the restaurant to track the user's spending.

In one aspect, the activity plotting logic 104 enables network operators to have better access to user activities and information. Network operators or advertisers can better target ads using the system because they can see the kinds of activities in which the user has engaged in a given location. Information from the users may be aggregated and presented to the network operators. For example, a particular type of user likes a particular type of food, and therefore the advertiser should target related advertisements to that type of user.

In one example, a user may share maps with other users. If a first user has provided metadata for locations in a particular region, such as San Francisco, and a second user has provided metadata for other locations, such as Oakland, then the users can share maps so that information provided by the first user, e.g., user-provided context information 116, will be available to the second user, if the first user agrees. Similarly, the information of the second user may be made available to the first user with the second user's permission. For example, information about the first user's favorite restaurants, sports activities, and movies may be made available to the second user. Other information, such as financial transactions, may remain private and restricted to the first user. The sharing user may control the type of information that are shared, and may define the other users who may access particular types of information such as calorie intake or expenses.

In one example, a report generator 118 generates reports based upon the user-provided context information 116, the general context information 108, and any other information available in the database 160 or generated by the activity plotting logic 104. For example, a report may list the values of a particular field or attribute of user-provided context information 116 for each day, week, or month within a range of dates. A report may be presented to the user 162 via a widget that displays the report superimposed on a map 152 of the display 144. A report may list, for example, the purchases that the user has made at s specific location, or the number of calories that a user has consumed each day in the past month, or the amount of money that a user has spent each week in the past year. These data values may be collected by the activity plotting logic 104 and retrieved by the report generator 118.

Note that although the example of FIG. 1 shows the activity plotting logic 104 located on a server, and the activity plotting logic 104 interacting via the network 132 with a client application or browser 142 located on a client computer 140, other configurations are possible. For example, the activity plotting logic 104 may be distributed across multiple servers, or may be located partially or fully on the client computer 140. In some examples, the client computer 140 may communicate with a map server and a location database directly, in which case the activity plotting logic may be located on the client device 140.

In one example, display logic 120 located on the server may provide a user interface. The user interface components may execute on the client device 140 as part of a client application 142. The client application 142 may be a web browser, e.g., Microsoft® Internet Explorer™ or the like. The client application or browser 142 generates a display 144 that presents the user interface components to a user 162 and accepts input from the user 162. More specifically, the information shown on the display 144 may include one or more maps 152, map locations 146 shown on the map, and optionally, in textual form. The block labeled display 144 in FIG. 1 includes information and user interface components, e.g., maps 152 and widgets 154, to be shown on a client display device 156, e.g., an LCD screen. The verb "display" as used herein refers to providing a user interface, which may include both the presentation of user interface components on the display device 156 and the receipt and processing of input from the user via an input device 158.

In one example, activity plotting logic 104 includes both server components and client components. The server components receive information from and send information to the client components. The server components also store information, e.g., in a database 160, for later retrieval. The server components include activity plotting logic 104 and web server logic 130, which interacts with the client device 140, e.g., by providing a web server through which the client can communicate with the activity plotting logic 104 via, for example, Hypertext Transfer Protocol (HTTP) and HyperText Markup Language (HTML) data sent via the network 132, which may be, for example, the Internet. In one example, web server logic 130 executes on the server computer 102 to receive HTTP requests from the client computer 140 via the network 132. The web server logic 130 makes the HTTP requests available to the activity plotting logic 104 as input. Output produced by the activity plotting logic 104, e.g., a response to an HTTP request, is sent by the web server logic 130 as an HTTP response to the client 140 via the network 132. In other examples, the communication between the client 140 and the server 102 may be implemented by other protocols, known to those skilled in the art, such as, for example, XmlHttpRequest, Adobe® Real Time Messaging Protocol, Adobe® Flash®, or the like. The server logic 104 may be implemented as computer program code in a programming language such as JavaScript™, Adobes Flash®, Java®, or the like. The server logic may provide user interface components, e.g., HTML pages, JavaScript™ components, widgets implemented in JavaScript™ or another programming language by making the user interface components available to clients, e.g., web browsers. The server logic may transmit the user interface components to the client via a computer network. In one aspect, display logic 120 may provide specific user interfaces to be presented as part of the display 144 on the client display device 156, including components such as text, maps, buttons, input fields, and widgets. The display logic 120 may transmit the user interfaces via the web server 130 to the client application or browser located on the client device 140. As a user 162 interacts with the user interface components on the client device 140, input data received from the user 162 may be transmitted from the client device 140 to the server computer 102 via the web server 130, and input logic 122 located on the server computer 102 may process the input data, e.g., by storing input data that represents user-specific information in the user-provided context information object 116. The user-provided context object 116 is in turn stored in the database 160.

In one example, the client device 140 may receive map locations 146, general context information 148, user-provided context information 150, maps 152, and widget user interfaces 154 from the server 102. The map locations 146 may be shown on the map 152 in the display 144 as numbers or other characters superimposed over their geographic locations on the map, with an accompanying textual list that displays descriptions of locations referred to by the numbers. Alternatively, the map locations may be described using text superimposed over the map 152 and associated with the corresponding geographic location, e.g., as a text label with an arrow pointing to the geographic location. The text descriptions may include, for example, general content information 148, such as the name of the location (e.g., "Joe's Diner"), the address of the location, and a short description of the location. The text descriptions may also include user-provided content information 150, such as a rating of the location based on information provided by users.

The display 144 may also display one or more widget user interfaces 154. A widget user interface may be, for example, a group of input fields, such as text input fields and pop-up menus, for which the user can supply values. The widget user interface 154 may also include text fields for displaying information. The widget user interfaces 154 may be, for example, JavaScript™ components that are downloaded from the server computer 102, or components in some other interface specification language. The widget user interfaces 154 receive information from and provide information to the widgets 114 located on the server 102. The appearance and operation of the widget user interfaces 154 is specified at least in part by the widgets 114. In one example, the widget user interfaces 154 are the same as the widgets 114, i.e., the widgets 114 are downloaded to the client device 140. The widget user interfaces receive data from and send data to the activity plotting logic 104 located on the server computer 102. The activity plotting logic 104 generates the data and stores the data as described elsewhere herein.

In one example, the client device 140 includes a Global Positioning System (GPS) receiver 170. The GPS receiver computes the geographic coordinates of the client device 140 based on satellite signals and makes the coordinates available to the activity plotting logic 104. The coordinates are sent to the server logic 104 via the network 132 via, for example the web server logic 130. Although the term Global Positioning System is used herein, the GPS receiver 170 may use any satellite-based system for determining a geographical location.

In one example, suggestion logic 117 may generate suggestions 119 for user actions based on the map location 112 that corresponds to the user's current geographical location, the general context information 108, and the user-provided context information 116. The suggestion logic 117 may include an inference engine 121 that performs rule-processing as known to those skilled in the art. For example, the suggestion logic 117 may include a set of rules that specify conditions and associated suggestions. A rule may specify that if the user enters a grocery store, a suggestion 119 to buy items on the user's shopping list should be generated. The suggestion logic 117 may also include an inference engine 121 for making logical inferences based on rules and assertions, i.e., information in a knowledge base, as known to those skilled in the art. The general context information 108 and the user-provided context information 116 provide the knowledge base for the inference engine 121. Therefore, suggestion logic 117 may generate suggestions 119 based upon the user's location, upon the general context information 108, and upon the user-provided context information 116, which may include the user's past activities and locations the user has previously visited. The rules may be, for example, logical conditions that generate a corresponding action if the rule is satisfied (i.e., true). For example, a rule may specify that if the season is winter, the weather is rainy, the user has allergies, and the user is in a location that sells allergy medicine, then a suggestion 119 to purchase allergy medicine should be generated. The inference engine 121 may be, for example, JBoss® Rules from Red Hat® Inc. of Raleigh, N.C., or the like.

In one example, the activity plotting logic 104 includes objects 106 that are computer-implemented representations of entities that are provided by the server logic 104. The server logic 104 creates the objects 106 by retrieving information from a database 160. The objects 106 include one or more maps 110, which may be retrieved from a map server (not shown). Associations between objects are shown as solid lines in FIG. 1, and communication, i.e., data transfer, between objects or components is shown as dashed lines. The solid lines illustrate that each map location 112 may be associated with a map 110, with general context information 108, with user-provided context information 116, and with one or more widgets 114.

The maps 110 may be represented by references to maps stored on a map server, e.g., as URL's, or may be map objects retrieved from a map server, e.g., bitmap data. The map locations 112 describe points of interest on the map(s) 110. For example, the map locations 112 may include an entry for a grocery store, which would include the name, coordinates, and address of the store, and an entry for a restaurant, which would similarly include the name, coordinates, and address of the restaurant. General context information 108 is associated with each map location 112. General context information 108 includes information that describes a particular map location and that may be shared among multiple users e.g., a description of a restaurant or a review of a restaurant. User-provided context information 116 includes information that descries a particular map location and that is provided by a particular user. In one example, user-provided context information 116 is not shared between users. User-provided context information 116 may be, for example, a list of groceries purchased by a user, or meals eaten at a restaurant by a user.

The activity plotting logic 104 may modify the objects 106, e.g., by adding information received from the client to the user-provided context information 116. The server logic 104 stores the modified objects 106 in the database 160. In other words, the server logic 104 uses storage/retrieval logic 126 to persist the objects 106 to the database 160. Note that the database 160 may represent multiple databases, but a single database 160 is shown in FIG. 1 for illustrative purposes. Also note that the activity plotting logic 104 may be distributed across multiple server computers, but a single server computer 102 is shown for illustrative purposes.

As an example, the activity plotting logic 104 processes the activity of a user named Gary as follows. Suppose that Gary walks into a drug store that he has not previously visited. The activity plotting logic 104 first determines Gary's location, e.g., Drugstore ABC, using coordinates received from the client device 140, then determines the length of time Gary has been at the location. If the length of time is less than a threshold value, e.g., 5 minutes or 10 minutes, then no further action is taken until the length of time reaches the threshold value or Gary leaves the drug store. If the length of time is greater than the threshold value, then the activity plotting logic 104 retrieves general context information 108 about Drugstore ABC from the database 160. The general context information 108 may be, for example Drugstore ABC's inventory. The activity plotting logic also retrieves user-provided context information 116, i.e., information about Gary. For example, the user-provided context information 116 may indicate, based on Gary's past activities, that Gary has allergies. Furthermore, based on general context information 108 such as the season of the year, and the current weather (e.g., raining), the suggestion logic 117 may infer that Gary is looking for cold medicine. The suggestion logic 117 may then select a brand of cold medicine from Drugstore ABC's inventory, e.g., Brand X, and generate a suggestion 119 stating that Gary may be interested in cold medicine, and that Drugstore ABC sells Brand X cold medicine. The suggestion logic 117 then transmits the suggestion to the client device 140 via the network 132, and the client device 140 displays the suggestion 119 on the display 156.

Once Gary is ready to buy items, the mobile device may automatically charge the items to his bank or credit card account. Gary may then walk out of the store with the items. When the mobile device detects that Gary has left the store's location, the mobile device may automatically submit his account information to a payment system in the store via a wireless network, or to an online payment system via the Internet.

In another example, the notification logic 117 may track and infer patterns in the user's activities, and generate suggestions based on those patterns. For example, if the user is normally in a certain location at a certain time, e.g., at a dining location at 5:30 pm each week day, but on a particular week day at nearly 5:30 pm the user is not near the usual dining location, then the suggestion logic 117 may generate a suggestion 119 that lists restaurants that meet the user's dietary requirements and that are near the user's current location.

Figure 2:
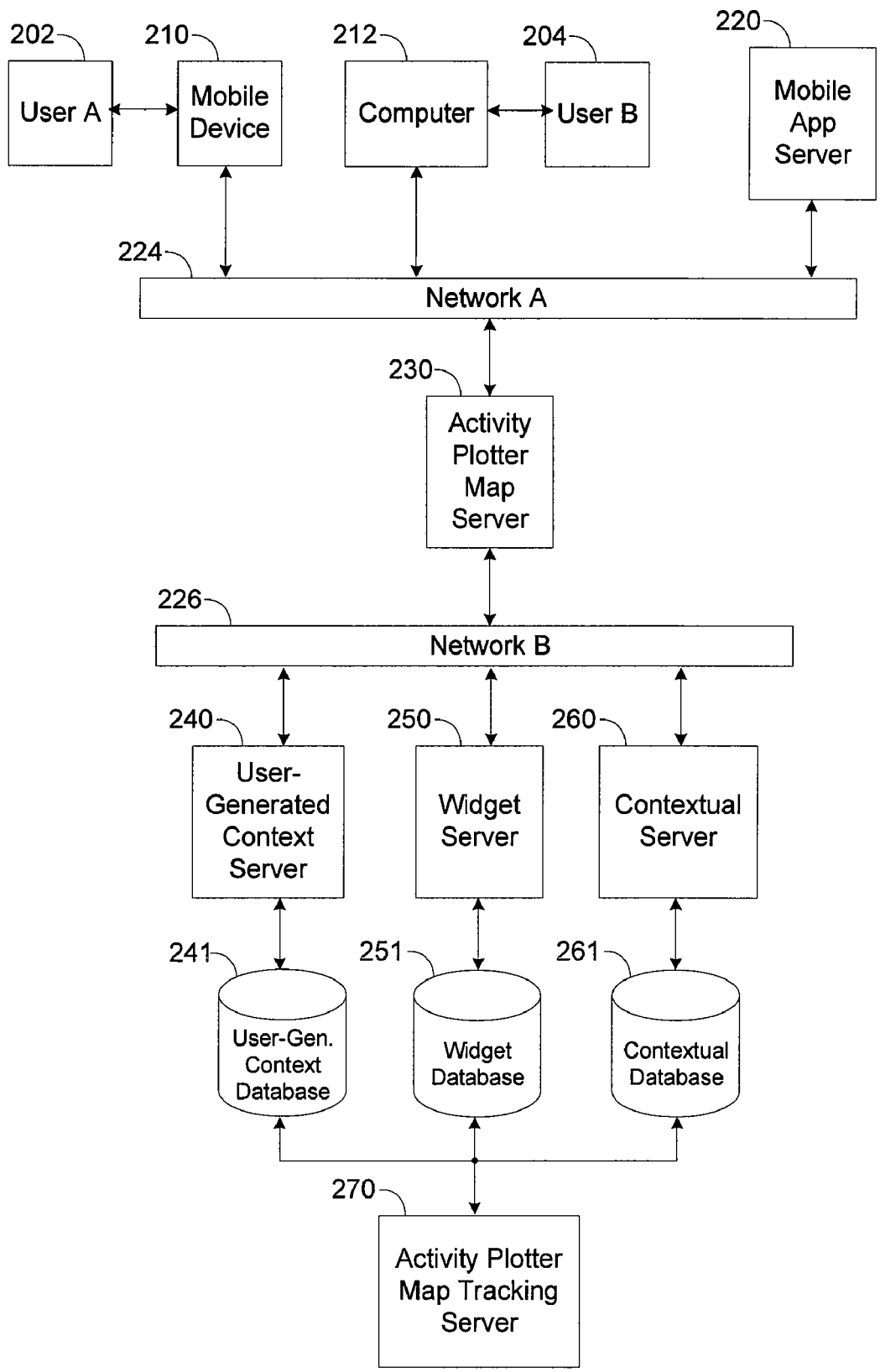
FIG. 2 illustrates an activity plotting system in which server logic is distributed across multiple server computers in accordance with embodiments of the invention.

FIG. 2 illustrates an activity plotting system in which server logic is distributed across multiple server computers in accordance with embodiments of the invention. A User A 202 interacts with a mobile device 210, which communicates with an activity plotter map server 230 via a network A 224. In one example a mobile app server 220 provides an interface between the mobile device 210 and the activity plotter map server 230. The activity plotter map server generates activity maps based on user-generated context information provided by a user-generated context server 240 and upon general (i.e., non-user-specific) context information provided by a contextual server 260. The activity plotter map server 230 may also add widgets to the activity maps. The widgets are provided by a widget server 250. The activity plotter map server 230 of FIG. 2 corresponds to the activity plotting logic 104 of FIG. 1 with some portions, such as the storage/retrieval logic, moved to separate servers in FIG. 2, e.g., to the user-generated context server 240, the widget server 250, and the contextual server 260. The activity plotter map server 230 may communicate with the user-generated context server 240, the widget server 250, and the contextual server 360 via a network B 126, which may be independent of or separate from the network A 124. Furthermore, the database of FIG. 1 is divided into three databases 241, 251, 261 in the example of FIG. 2. The three databases include a user-generated context database 241 that stores user-generated context information, a widget database 251 that stores widgets and related information, such as widget configurations, and a contextual database 261 that stores general contextual information, e.g., a database of businesses and points of interest at particular latitude and longitude coordinates.

In one example, an activity plotter map tracking server 270 tracks, i.e., monitors and/or records, the activities processed by the activity plotter map server 230. The tracking server 270 may generate a log and other information that may be of use to service providers in analyzing user activities, such as shopping preferences, patterns, effects of advertisements in geographical locations on potential customers or store visitors in those locations, and the like.

The mobile device 210 is similar to the client device 140 of FIG. 1. The computer 212 is, for example, a personal computer, and may interact with the activity plotter map server 230 as, for example, a web client, to display and modify activity map information similarly to the mobile device 210. Therefore the features and aspects described herein for the client device 140 may also be available on a computer 212 or other computing device that accesses the activity plotter map server 230 via the network A 224.

Figure 3:
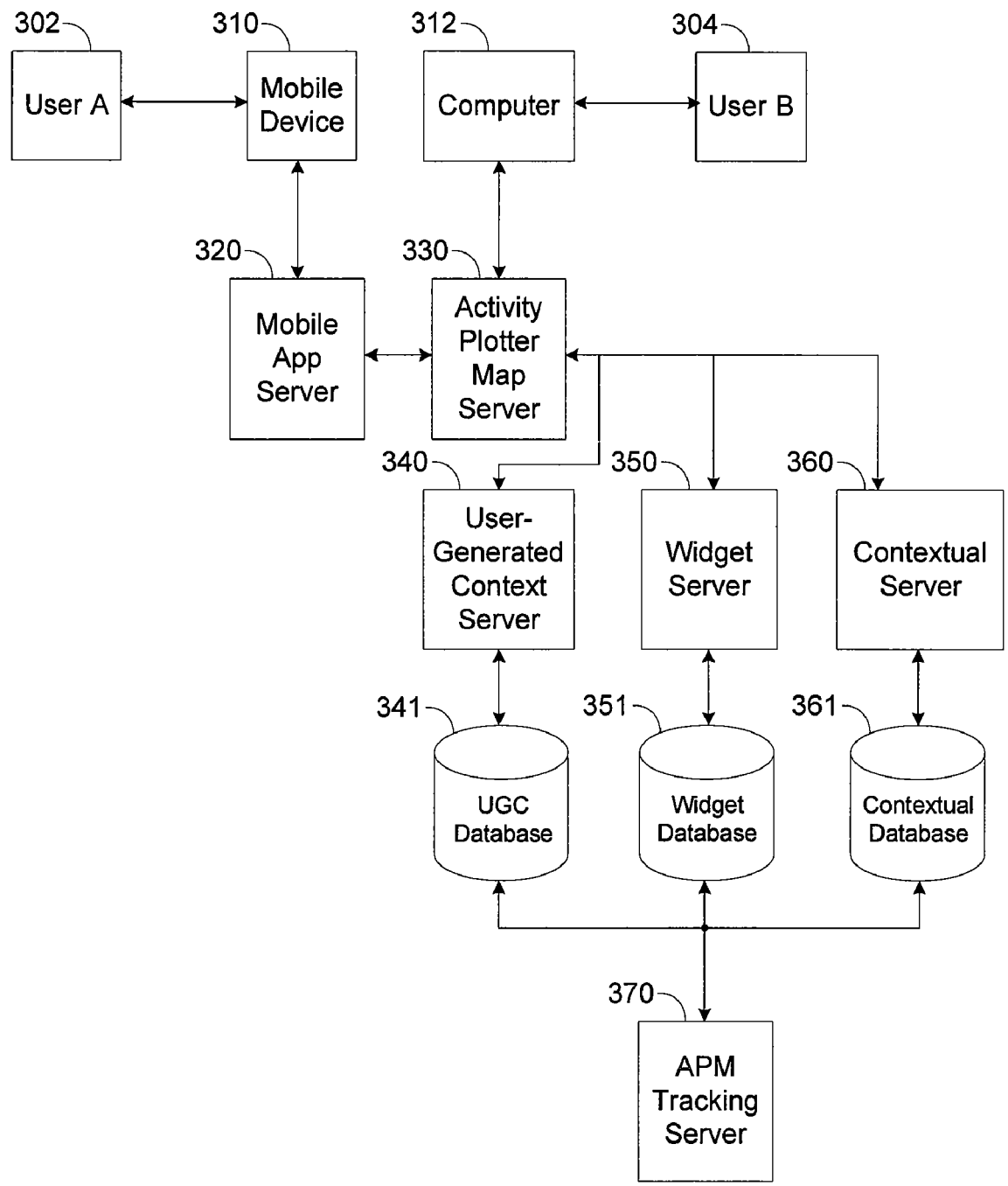
FIG. 3 illustrates operations in an activity plotting system in accordance with embodiments of the invention.
Figure 4:
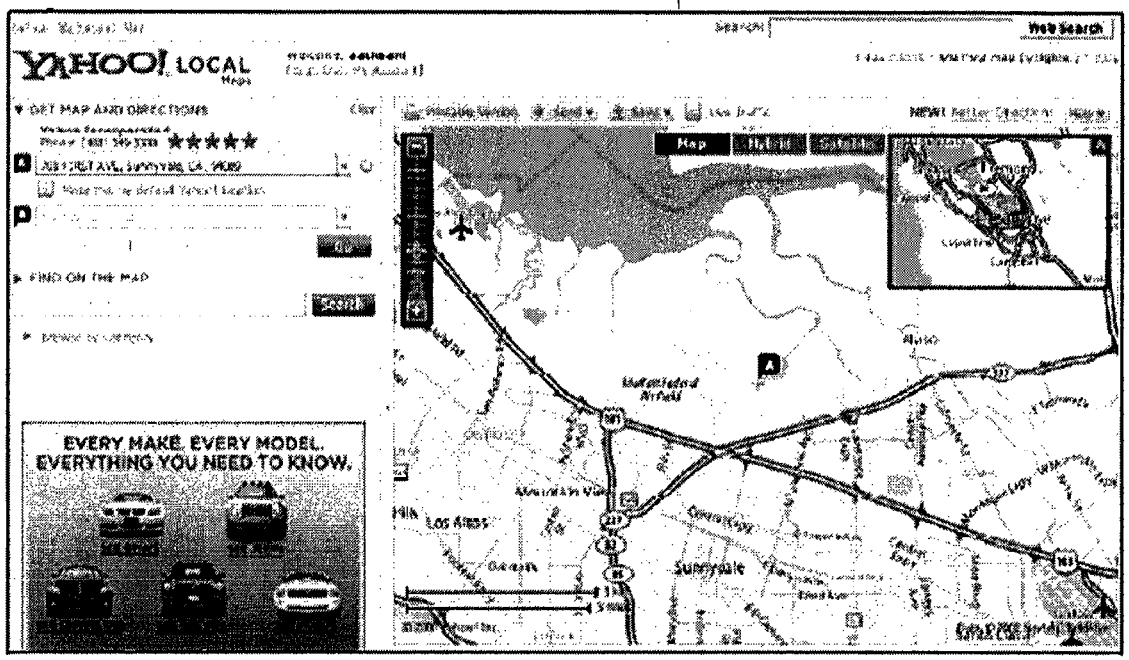
FIG. 4 illustrates an interface for allowing a user to select a base location in accordance with embodiments of the invention.
Figure 5:
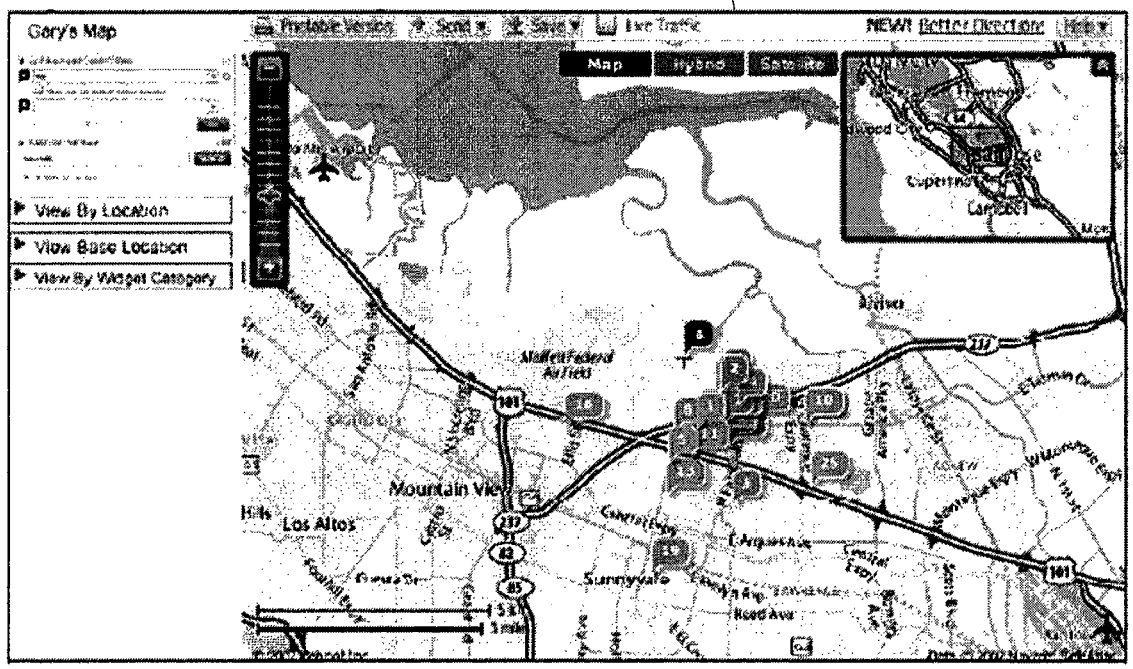
FIG. 5 illustrates an interface for allowing a user to enter favorite spots in accordance with embodiments of the invention.

FIG. 3 illustrates operations in an activity plotting system in accordance with embodiments of the invention. A user A 302 interacts with a mobile device 310. To begin using the activity plotting map features, user A sets the mobile device 310 to track locations and activities. Then the client application or browser 142 (as shown in FIG. 1) sends the GPS coordinates of the mobile device to the mobile application server 320, which sends the coordinates to the activity plotter maps server 330. The activity plotter maps server 330 queries the contextual server 360 for information about the coordinates. The activity plotter maps server 330 queries a user-generated context server 340 and a widget server 350. The user-generated context server 340 provides any previous entries made by user A, while the widget server 350 selects relevant widgets for the location. The activity plotter map server 330 tracks the user's location by monitoring the coordinates received from the user's device 310. When a user enters a location, the activity plotter map server 330 or the client application 142 tracks the amount of time spent within the geographical boundaries of the location (during the present visit) and determines the location's contextual relevancy to the user, as described elsewhere herein. If the location is relevant to the user, and the user has been present at the location for a sufficient time, then the client application 142 displays user-generated context information on a map in association with the location (e.g., superimposed on the location or represented by a number superimposed on the location). The user-generated context information is retrieved from the database 341 by the user-generated context server 340, which transmits the information to the activity plotter map server 330, which in turn transmits the information to the mobile application server 320, which transmits the information to the mobile device 310.

In one example, the client application 142 displays general context information about the location if the user has never visited the location. General context information is retrieved from the database 361 by the contextual server 360, which transmits the information to the activity plotter map server 330, which in turn transmits the information to the mobile application server 320, which transmits the information to the mobile device 310.

In one example, the activity plotter map server 330 or the client application 142 selects relevant widgets for the user based on the contextual relevancy of the location to the user. If one or more contextually relevant widgets are found, they are provided to the client application 142, which executes them. The widget(s) prompt the user to enter data. The widgets are retrieved from the database 351 by the widget server 350, which transmits the widgets to the activity plotter map server 330, which in turn transmits the widgets to the mobile application server, which transmits the widgets, or at least the user interfaces of the widgets, to the mobile device 310. Data entered by the user into the widgets is transmitted from the mobile device 310 to the mobile application server 320, to the activity plotting map server 330, to the user-generated context server 340, which stores the data in the user-generated context database 341.

FIGS. 4-8 illustrate an interfaces for allowing a user to select a base location, to enter favorite spots, to assign widgets to map locations, to enter user-generated context information, and to generate a report, respectively, in accordance with embodiments of the invention. Referring to FIG. 3, in one example, a user B 304 may interact with a computer 312. The user uses the computer to access the activity plotting map features such as managing locations (create, edit, view, and delete), managing widgets (select, edit, view and delete) for locations, managing activities (create edit view and delete entries) in locations, and viewing reports. (In other examples, these operations may also be performed on a mobile device 210.) The activity plotting map server 330 receives a request from the computer 312, parses the information and actions taken by the user, and transmits the information and actions to the appropriate server(s). For example, a user interaction may begin when a user B 304 selects a base location and saves the selection, as shown in the user interface 402 of FIG. 4. The activity plotting map server 330 sends the information to the user-generated context server 340, which stores the information in the user-generated context database 341. The user may then select favorite spots on the base location, as shown in the user interface 502 of FIG. 5. The activity plotting map server 330 sends the information about favorite spots to the user-generated context server 340, which stores the information in the user-generated context database 341. In this case, the activity plotting map server 330 also sends the information to the contextual server 360 to get contextual information. The contextual server 360 queries the contextual database 361 and returns the information to the activity plotting map server 330, which sends the information back to the computer 312.

Figure 6:
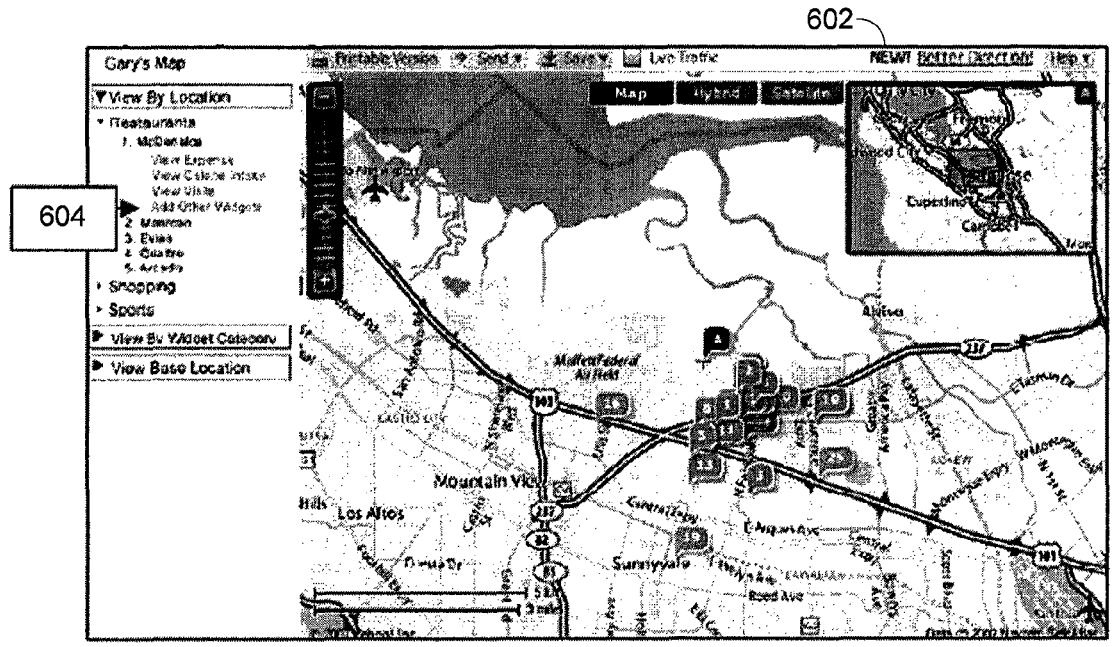
FIG. 6 illustrates an interface for allowing a user to assign widgets to map locations in accordance with embodiments of the invention.
Figure 7:
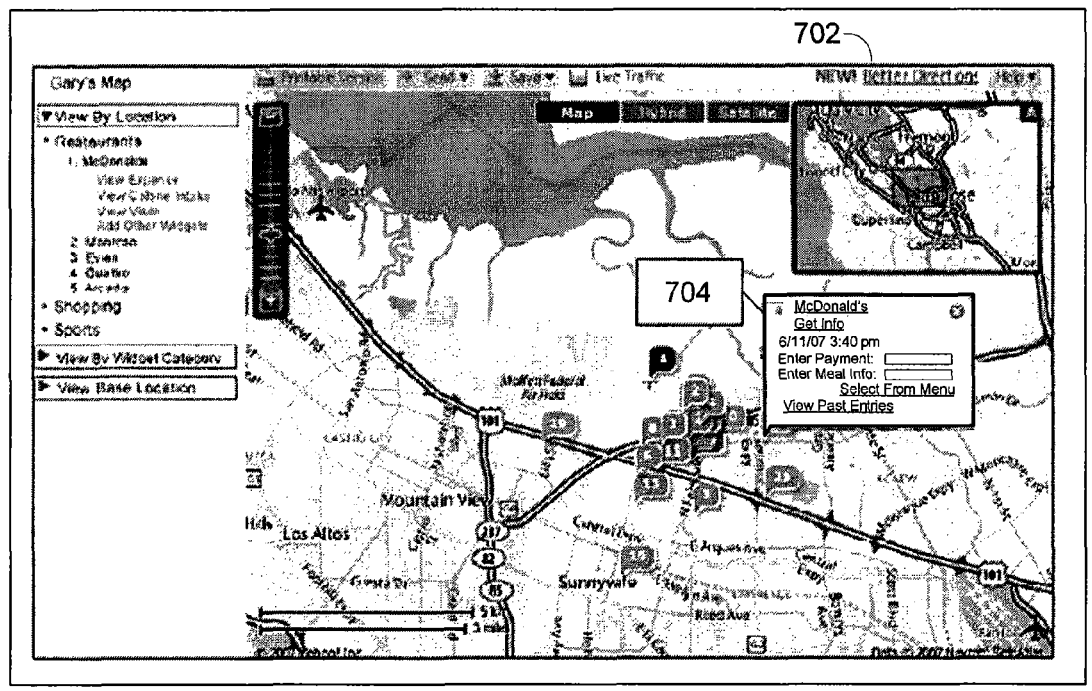
FIG. 7 illustrates an interface for allowing a user to enter user-generated context information in accordance with embodiments of the invention.

In one example, the activity plotting map server 330 sends the information to the widget server 350, which selects widgets based on contextual information about the location(s) referred to by the information. The user B 304 may optionally select other widgets using an interface, e.g., an "Add Other Widgets" feature 604 of a graphical user interface 602 as shown in FIG. 6, on the computer 312. The user B 304 may then use the widgets to track activities. The user enters information through the activity plotting map widget user interface 704 displayed on the map user interface 702 of FIG. 7. The widget server 350 and widget database 351 keep track of widget activities. The activity plotting map tracking server 370 tracks the activities concurrently with the user interactions, and is analogous to the activity plotting map tracking server 271 of FIG. 2.

Figure 8:
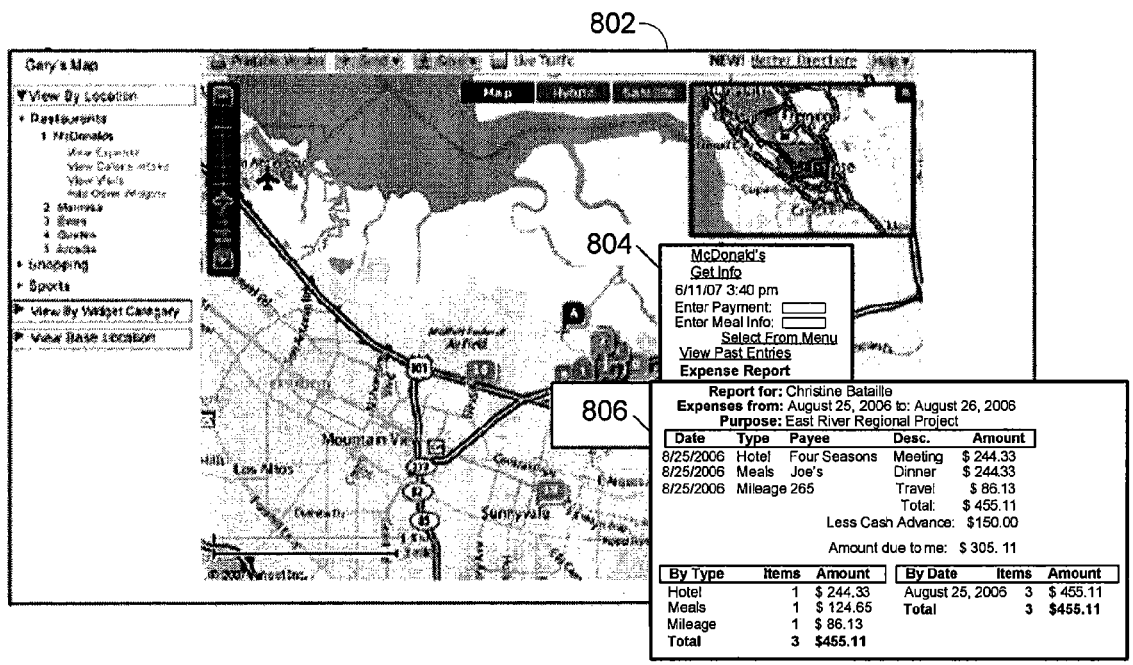
FIG. 8 illustrates an interface for presenting a report in accordance with embodiments of the invention.

In one example, the user B 304 may generate a report 806 as shown in FIG. 8 based on locations visited and activities performed through the graphical user interface 802. The user may generate the report by clicking an Expense Report link on the widget user interface 804 for a location, or by clicking an Expense Report link or icon displayed elsewhere on the map interface 802. The information for the report 806 is obtained from the user-generated context server 340 and database 341 and/or the widget server 350 and database 351. The example report 806 is an expense report for a user. The expense report 806 is generated from user-generated context information received for three locations on Aug. 25, 2006. The locations are a Four Seasons hotel, Joe's restaurant, and streets on which the user drove during that time. The report lists the user's actions, i.e., visiting the hotel, restaurant, and driving, by date, and displays the amounts of money the user has spent for each action, and the total spent for all actions. The report also lists the actions by type, i.e., hotel, meals, and mileage, and displays the total amount of money spent and number of actions for each action type. The report further lists the actions by date, and displays the total number of items and amount of money for each date.

Figure 9A:
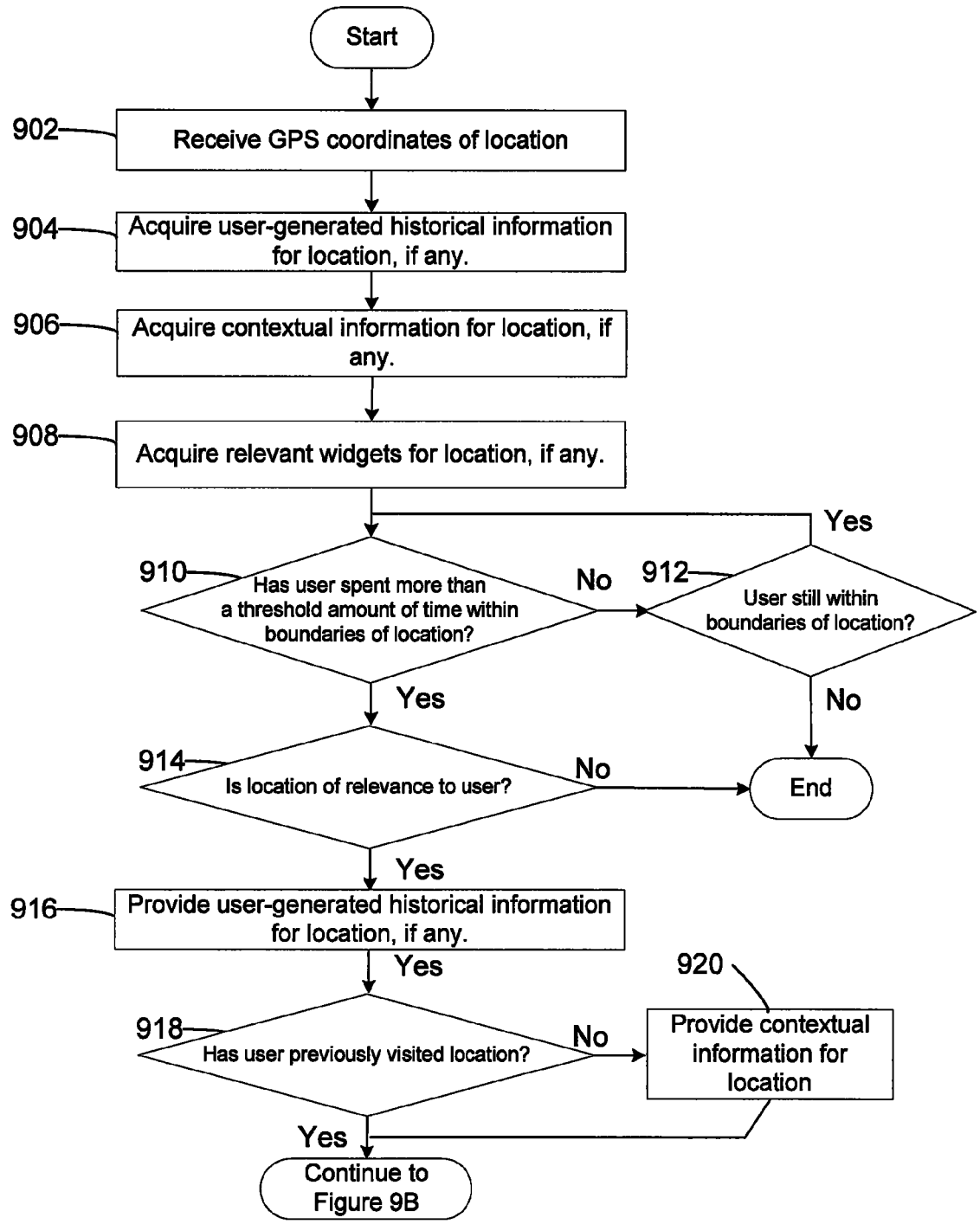
FIGS. 9A and 9B illustrate a flow diagram of a process for presenting and updating an activity plotting map with suggestion features in accordance with embodiments of the invention.
Figure 9B:
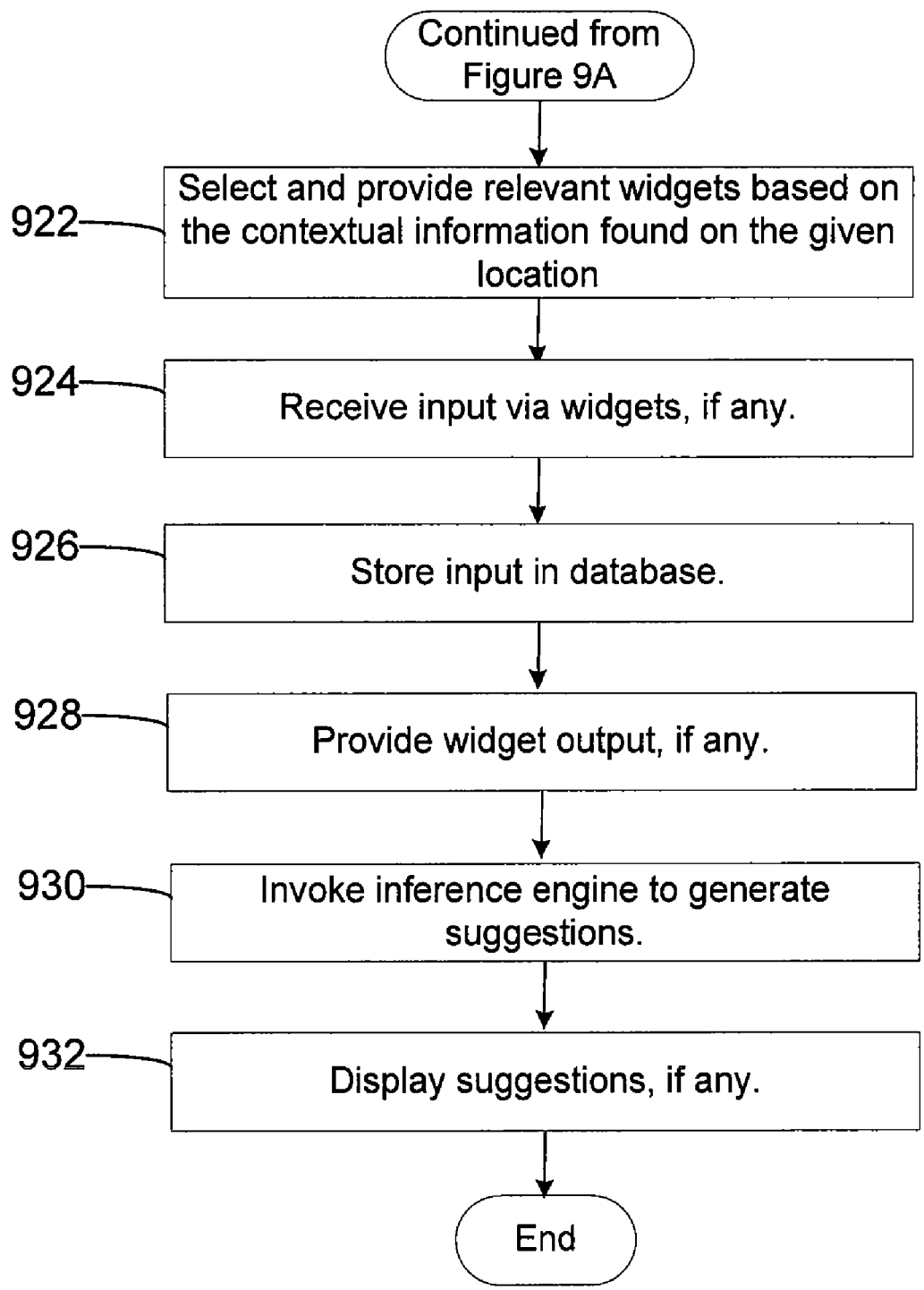

FIGS. 9A and 9B illustrate a flow diagram of a process for presenting and updating an activity plotting map with suggestion features in accordance with embodiments of the invention. The flow diagram may be implemented by, for example, computer program code encoded on a computer-readable medium. The process begins at block 902 of FIG. 9A by receiving the coordinates (e.g., from a GPS receiver) of a location. Block 904 acquires user-generated historical context information for the location, if any such information exists. Block 906 acquires general (i.e., non-user-generated) contextual information for the location, if any exists. Block 908 acquires one or more widgets for the location that are contextually relevant to the user, if any exist. Block 910 determines if the user has spent more than a threshold amount of time (e.g., 1 minute or 10 minutes, continuously) within the boundaries of the location. If not, block 912 determines if the user is still within the boundaries of the location, and if so, the time continues to accumulate until the threshold time is reached or the user leaves the location. If the threshold time is not reached, i.e., the user leaves the location before the threshold time has elapsed, then the process ends.

If the user does spend more than the threshold amount of time at the location, then block 914 determines if the location is contextually relevant to the user. If not, the process ends. If so, block 916 provides the user-generated historical context information to the user interface, which may present the information to the user. Block 918 determines if the user has previously visited the location. If not, block 920 provides the general contextual information for the location, and the process continues. If so, the general contextual information is not provided, and the process continues. Referring to FIG. 9B, block 922 selects and provides relevant widgets based upon the contextual information found for the given location. The term "provides" refers to providing the widgets to a client application or web browser for execution. If relevant widgets exist, the relevant widgets execute and prompt the user for input. Block 924 receives input from the user via the relevant widgets. Block 926 stores the input in a database, e.g., the user-generated context database 241 of FIG. 2. Block 928 provides, i.e., displays, any output generated by the widget, so that the user can view the widget output. Block 930 invokes an inference engine, such as the inference engine 121 of FIG. 1, to generate suggestions, as described elsewhere herein. Block 932 displays any suggestions that have been generated.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 10:
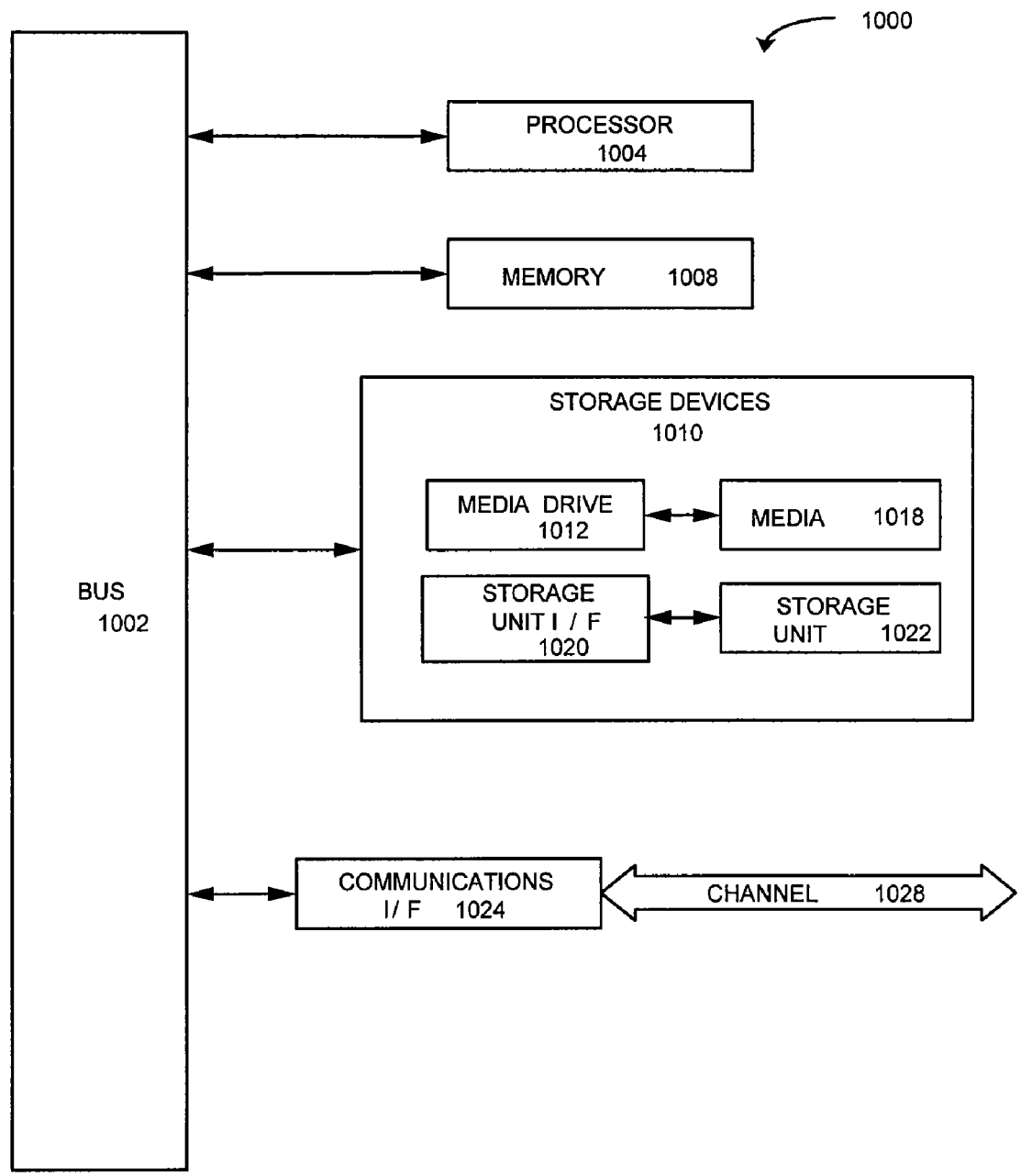
FIG. 10 illustrates a typical computing system that may be employed to implement processing functionality in embodiments of the invention.

FIG. 10 illustrates a typical computing system 1000 that may be employed to implement processing functionality in embodiments of the invention. Computing systems of this type may be used in clients and servers, for example. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special purpose processing engine such as, for example, a microprocessor, microcontroller or other control logic. In this example, processor 1004 is connected to a bus 1002 or other communication medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory ("ROM") or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1018, may include, for example, a hard disk, floppy disk, magnetic tape, optical disk, CD or DVD, or other fixed or removable medium that is read by and written to by media drive 1014. As these examples illustrate, the storage media 1018 may include a computer-readable storage medium having stored therein particular computer software or data.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a USB port), a PCMCIA slot and card, etc. Software and data transferred via communications interface 1024 are in the form of signals which can be electronic, electromagnetic, optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 1008, storage device 1018, or storage unit 1022. These and other forms of computer-readable media may be involved in storing one or more instructions for use by processor 1004, to cause the processor to perform specified operations. Such instructions, generally referred to as "computer program code" (which may be grouped in the form of computer programs or other groupings), when executed, enable the computing system 1000 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1014, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A computing device, comprising:
   storage;
   at least one processor;
   logic stored on the storage, and implemented by the at least one processor, comprising:
   logic for detecting that a mobile device is present at a geographic location, wherein the location is relevant to a user of the mobile device;
   logic for retrieving context information associated with the location and the user;
   logic for selecting a program code module based upon a contextual relevancy of the location and the context information associated with the user, said contextual relevancy is determined in accordance with historical information related to the user and similarity of the location with respect to the user's historical information;
   logic for providing the program code module for execution by said at least one processor, wherein the program code module is operable to perform processing specific to and based at least in part on at least one aspect of the context information associated with the location and the user, and the program code module is further operable to receive at least one input data item from the mobile device, wherein the at least one input data item describes an activity of the user at the location; and
   logic for associating the at least one input data item with the location.

2. The computing device of claim 1, wherein the context information comprises user-independent information, user-specific information associated with the user, or a combination thereof.

3. The computing device of claim 1, wherein detecting that a mobile device is present at a geographic location comprises receiving coordinates of the mobile device and waiting until the mobile device has been present at the location for more than a threshold period of time.

4. The computing device of claim 1, wherein the program code module comprises a widget.

5. The computing device of claim 1, wherein providing comprises providing the program code module to a client device.

6. The computing device of claim 1, wherein providing comprises causing execution of the program code module.

7. The computing device of claim 1, wherein processing comprises displaying the context information, querying a computer system for the at least one input data item, receiving the at least one input data item from the computer system, querying a user for the at least one input data item, receiving the at least one input data item from the user via an input device of the mobile device, or a combination thereof.

8. The computing device of claim 1, wherein associating the at least one input data item with the location comprises storing the at least one input data item in a database in association with the location.

9. A computing device comprising:
storage;
at least one processor;
logic stored on the storage, and implemented by the at least one processor, comprising:
logic for detecting that a mobile device is present at a geographic location, wherein the location is relevant to a user of the mobile device;
logic for retrieving context information associated with the location and the user;
logic for selecting a program code module based upon a contextual relevancy of the location and the context information associated with the user, said contextual relevancy is determined in accordance with historical information related to the user and similarity of the location with respect to the user's historical information; and
logic for providing the program code module for execution by said at least one processor, wherein the program code module is operable to perform processing specific to and based at least in part on at least one aspect of the context information associated with the location and the user, and the program code module is further operable to select at least one output data item from the context information and to provide the at least one output data item to the mobile device.

10. The computing device of claim 9, wherein the context information comprises user-independent information, user-specific information associated with the user, or a combination thereof.

11. The computing device of claim 9, wherein detecting that a mobile device is present at a geographic location comprises receiving coordinates of the mobile device and waiting until the mobile device has been present at the location for more than a threshold period of time.

12. The computing device of claim 9, wherein the program code module comprises a widget.

13. The computing device of claim 9, wherein providing comprises providing the program code module to a client device.

14. The computing device of claim 9, wherein providing comprises causing execution of the program code module.

15. A computing device comprising:
storage;
at least one processor;
logic stored on the storage, and implemented by the at least one processor, comprising:
logic for receiving a location of a user, wherein the location corresponds to geographical coordinates of the user;
logic for retrieving context information that corresponds to the location and the user;
logic for determining if the location is relevant to the user based upon the context information, wherein said relevance is based upon a similarity of the location with historical information related to the user;
logic for selecting a program code module if the location is relevant to the user, wherein the program code module is selected based upon the contextual relevancy of the location to the user, and the contextual relevancy is based upon the location and the context information associated with the location and the user; and
logic for providing the program code module for execution by said at least one processor, wherein the program code module is operable to provide at least one output data item, receive at least one input data item, or a combination thereof.

16. The computing device of claim 15, wherein the program code module is operable to generate the at least one output data item based upon the context information.

17. The computing device of claim 15, further comprising logic for retrieving user context information that corresponds to the location.

18. The computing device of claim 15 wherein the location is within a predetermined distance of the geographical coordinates of the user.

19. The computing device of claim 15, wherein the program code module comprises a widget.

20. The computing device of claim 15, wherein providing comprises providing the program code module to a client device.

21. The computing device of claim 15, wherein providing comprises causing execution of the program code module.

22. A computer-readable storage medium comprising computer-executable instructions, that when executed by a computer device, perform a method, comprising:
detecting that a mobile device is present at a geographic location, wherein the location is relevant to a user of the mobile device;
retrieving context information associated with the location and the user;
selecting a program code module based upon a contextual relevancy of the location and the user, said contextual relevancy is determined in accordance with historical information related to the user and similarity of the location with respect to the user's historical information;
causing execution of the program code module, wherein the program code module is operable to perform processing specific to at least one aspect of the location, wherein the processing is based upon the context information associated With the location and the user, and the program code module is further operable to receive at least one input data item from the mobile device, wherein the at least one input data item describes an activity of the user at the location; and
associating the at least one input data item with the location in accordance with the historical information of the user.

23. The computer-readable storage medium of claim 22, wherein the context information comprises user-independent information, user-specific information associated with the user, or a combination thereof.

24. The computer-readable storage medium of claim 22, wherein detecting that a mobile device is present at a geographic location comprises receiving coordinates of the mobile device and waiting until the mobile device has been present at the location for more than a threshold period of time.

25. The computer-readable storage medium of claim 22, wherein the program code module comprises a widget.

26. A computer-readable storage medium comprising computer-executable instructions, that when executed by a computer device, perform a method, comprising:

detecting that a mobile device is present at a geographic location, wherein the location is relevant to a user of the mobile device;

retrieving context information associated with the location and the user;

selecting a program code module based upon a contextual relevancy of the location and the user, said contextual relevancy is determined in accordance with historical information related to the user and similarity of the location with respect to the user's historical information; and causing execution of the program code module, wherein the program code module is operable to perform processing specific to and based at least in part on the context information associated with the location and the user, and the program code module is further operable to select at least one output data item from the context information and to provide the at least one output data item to the mobile device.

27. The computer-readable storage medium of claim 26, wherein providing the at least one output data item comprises causing display of the at least one output data item on a mobile device.

28. The computer-readable storage medium of claim 26, wherein providing the at least output data item comprises transmitting the at least one output data item to the computer via a network.

29. A computer-readable storage medium comprising computer-executable instructions, that when executed by a computer device, perform a method, comprising:

receiving a location of a user, wherein the location corresponds to geographical coordinates of the user;

retrieving context information that corresponds to the location and the user;

determining if the location is relevant to the user, based upon the context information corresponding to the location and the user;

selecting a program code module in response to the location being relevant to the user, wherein the program code module is selected based upon the contextual relevancy of the location to the user, and the contextual relevancy is based upon the location and the context information associated with the user, said contextual relevancy is determined in accordance with historical information related to the user and similarity of the location with respect to the user's historical information; and providing the program code module for execution, wherein the program code module is operable to provide at least one output data item, receive at least one input data item, or a combination thereof, wherein said providing and receiving is specific to and based at least in part on at least one aspect of the context information associated with the location and the user.

30. The computer-readable storage medium of claim 29 wherein the program code module is operable to generate the at least one output data item based upon the context information.

31. The computer-readable storage medium of claim 29, the instructions further comprising retrieving user context information that corresponds to the location.

32. The computer-readable storage medium of claim 29, wherein the location is within a predetermined distance of the geographical coordinates of the user.

33. The computer-readable storage medium of claim 29, wherein the program code module comprises a widget.

* * * * *